United States Patent [19]

Fujita et al.

[11] 4,198,817
[45] Apr. 22, 1980

[54] EXHAUST GAS DIFFUSER

[75] Inventors: Tomio Fujita; Hideyuki Ueda, both of Toyota, Japan

[73] Assignee: Toyota Jidosha Kogyo Kabushiki Kaisha, Japan

[21] Appl. No.: 882,387

[22] Filed: Mar. 1, 1978

[30] Foreign Application Priority Data

Dec. 13, 1977 [JP] Japan .................................. 52-149623

[51] Int. Cl.² .............................................. F01N 5/04
[52] U.S. Cl. ................................................... 60/319
[58] Field of Search ................... 60/317, 319, 324, 264

[56] References Cited

U.S. PATENT DOCUMENTS

| | | | |
|---|---|---|---|
| 2,586,788 | 2/1952 | Cushman | 60/317 |
| 3,011,524 | 12/1961 | Seils | 60/324 |
| 3,227,240 | 1/1966 | Lee | 60/264 |
| 3,788,072 | 1/1974 | Burger | 60/324 |
| 3,857,458 | 12/1974 | Ohtani | 60/319 |

FOREIGN PATENT DOCUMENTS 489702 6/1970 Switzerland .............................. 60/319
760493 10/1956 United Kingdom ....................... 60/319

*Primary Examiner*—Douglas Hart
*Attorney, Agent, or Firm*—Stevens, Davis, Miller & Mosher

[57] ABSTRACT

An exhaust gas diffuser to be connected to the discharge end of an exhaust pipe of an engine, having a tubular body of a relatively flattened cross-sectional shape and having opposite open axial ends, wherein the discharge end of the exhaust pipe is connected to one of the open opposite ends while the openings left at opposite sides of the discharge end of the exhaust pipe form first external air inlet ports, wherein second external air inlet ports are provided at opposite flattened wall portions of the tubular body with upstream edges of the second external air inlet ports being obliquely bent inwardly so as to define a throttling nozzle, while the other open axial end of the tubular body forms an exhaust port through which exhaust gases discharged from the exhaust pipe are discharged mixed with air entrained principally through the second external air inlet ports.

3 Claims, 7 Drawing Figures

EXHAUST GAS DIFFUSER

BACKGROUND OF THE INVENTION

The present invention relates to an exhaust gas diffuser for use with an exhaust system of an internal combustion engine and connected to the end of an exhaust pipe principally for the purpose of reducing the temperature of the exhaust gases discharged from the exhaust pipe to the atmosphere.

In recent years there has been a tendency for the temperature of the exhaust gases discharged from the exhaust pipe of an automobile engine to become hotter due to techniques used for exhaust gas purification, and because of this thermal problems such as burning and fire caused by hot exhaust gases discharged from an automobile engine have now become a more serious problem. As a means for reducing the temperature of the gases discharged from an automobile engine, an exhaust gas diffuser is known which is adapted to be mounted to the discharge end of an exhaust pipe so that hot exhaust gases are mixed with cold atmospheric air within the diffuser before being discharged to the atmosphere. Such an exhaust gas diffuser typically comprises a tubular body defining a passage therein which has a cross-sectional area larger than the internal cross-sectional area of the corresponding exhaust pipe, a connecting port provided at an axial end of the tubular body for connection with the exhaust pipe, an external air inlet port provided adjacent to the connecting port at an axial end of the tubular body, and an exhaust port provided at the other axial end of the tubular body, wherein it is intended that the flow of exhaust gases discharged from the connecting port into the passage defined by the tubular body causes entrainment of external atmospheric air into the passage through the external air inlet port due to the well-known Venturi effect so that the exhaust gases discharged from the exhaust pipe are mixed with external atmospheric air before they are discharged from the exhaust port of the tubular body. However in this conventional type of exhaust gas diffuser the entrainment of external atmospheric air into the tubular body through said external air inlet port does not actually effectively occur and exhaust gases are still discharged from the exhaust port of the tubular body without being sufficiently mixed with atmospheric air and thus without their temperature being sufficiently lowered.

SUMMARY OF THE INVENTION

It is therefore the object of the present invention to provide an improved exhaust gas diffuser which provides better entrainment of external atmospheric air into its interior so as to provide better premixing of exhaust gases with atmospheric air and sufficient reduction of their temperature before they are discharged from the diffuser to the atmosphere.

In accordance with the present invention, the above-mentioned object is accomplished by providing an exhaust gas diffuser for connection to the discharge end of an exhaust pipe of an internal combustion engine, comprising a tubular body defining a passage therein which has a cross-sectional area larger than the internal cross-sectional area of the exhaust pipe, a connecting port provided at an axial end of the tubular body for connection with the exhaust pipe, a first external air inlet port provided adjacent to the connecting port at the axial end of the body, an exhaust port provided at the other axial end of the tubular body, a second external air inlet port provided at an axially middle portion of the tubular body, and a guide vane which defines an upstream edge of the second external air inlet port while it also defines a throttling nozzle at an axially middle portion of the passage defined by the tubular body.

By the provision of a second external air inlet port and a guide vane such as those defined above, the inventors have found that the air entraining performance of the diffuser is substantially improved when compared with the conventional diffuser having the structure as mentioned before. In this connection, it is desirable that the tubular body has a cross-sectional shape having a smaller hydraulic mean depth than a circle of equivalent area, i.e. a relatively flattened shape such as an oval or ellipse. In this case it is also desirable that the second external air inlet port is provided in the flattened wall portion of the tubular body, and it is also desirable that such a second external air inlet port is provided as a pair of openings provided in opposite flattened wall portions of the tubular body. When a pair of second external air inlet ports are provided, it will also be automatically required that the guide vane is provided as a pair. Furthermore, in order to obtain uniform temperature distribution of the gases discharged from the diffuser, it is desirable that certain dimensional conditions are satisfied as given by way of example in the following explanation of the preferred embodiment.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
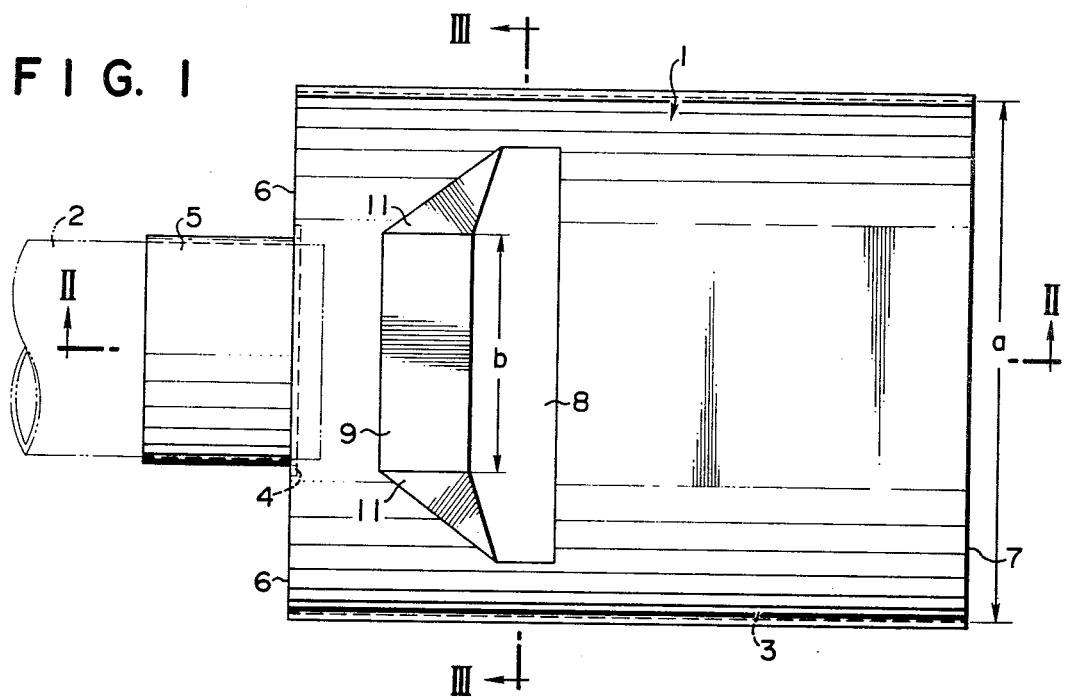
FIG. 1 is a plan view showing an embodiment of the exhaust gas diffuser of the present invention.
Figure 2:
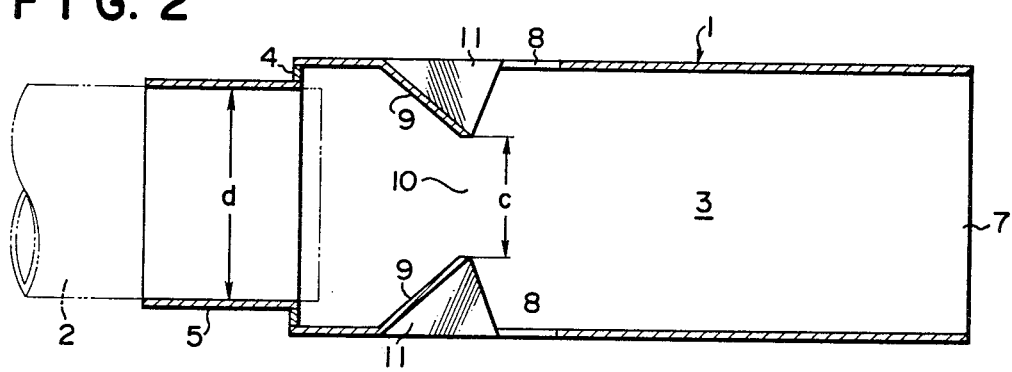
FIG. 2 is a longitudinal sectional view of the diffuser along line II—II in FIG. 1.
Figure 3:
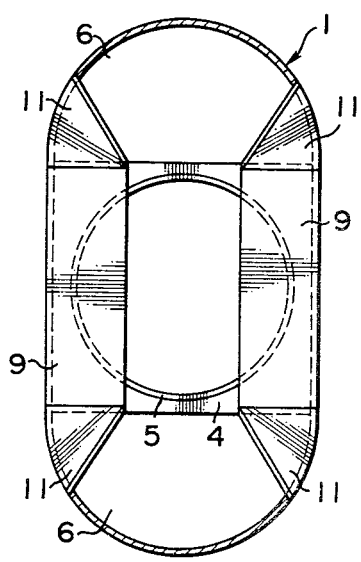
FIG. 3 is a cross-sectional view of the diffuser along line III—III in FIG. 1.

Referring to FIGS. 1–3, the exhaust gas diffuser herein shown comprises a tubular body 1 defining a passage therein which has a cross-sectional area larger than the internal cross-sectional area of an exhaust pipe 2 to the discharge end of which the diffuser is connected. The main portion of the passage defined in the tubular body 1 serves as a diffusion chamber 3. In the shown embodiment, the tubular body has an oval cross-sectional shape, as is best shown in FIG. 3. The tubular body has open opposite axial ends, and at one of its axial ends, that is, its upstream end, a connecting pipe 5 for connection with the exhaust pipe 2 is mounted by a mounting plate 4, thereby defining a connecting port through which exhaust gases are discharged from the exhaust pipe 2. At opposite sides of the mounting plate 4 are left open end portions of the tubular body which thus define first external air inlet ports 6 provided adjacent to the connecting port at the upstream axial end of the tubular body. The other open axial end, i.e. the downstream end of the tubular body, defines an exhaust port 7 through which the exhaust gases mixed with external atmospheric air beforehand as explained hereinunder are discharged to the atmosphere. A pair of second external air inlet ports 8 are provided in the opposite flat side wall portions of the tubular body at an axially middle portion thereof. However, as shown in FIGS. 1 and 2, it is desirable that the second external air inlet ports 8 are located closer to the upstream end than to the downstream end of the tubular body. The upstream edges of the second external air inlet ports 8 are defined by a pair of obliquely arranged guide vanes 9 which also define a throttling nozzle 10 located upstream of the diffusion chamber 3. Opposite side ends of the guide vanes 9 are integrally connected to wing vanes 11 which eliminate sharp side edges on the guide vanes and so avoid vibration and/or whistling of the guide vanes and also serves as reinforcing strut members for firmly supporting the guide vanes 9.

The exhaust gas diffuser is mounted to the discharge end of the exhaust pipe 2, as shown in FIGS. 1 and 2, by inserting the discharge end of the exhaust pipe into the connecting pipe 5 of the diffuser. In this case the discharge end of the exhaust pipe may be inserted into the tubular body a little more than the extent shown in FIGS. 1 and 2. The exhaust gases discharged from the exhaust pipe 2 flow through the throttling nozzle 10 and are throttled therein and thereby accelerated toward the diffusion chamber 3. Due to the acceleration of the gas flow through the throttling nozzle 10, the static pressure of the throttled flow of gases is reduced. Due to this reduction of static pressure and Venturi effect caused by the flow of gases ejected from the throttling nozzle 10, a large amount of external atmospheric air is inducted into the diffusion chamber 3 through the second external air inlet ports 8, in addition to induction of a relatively small amount of air through the first external air inlet port 6 which is principally caused by ejection of exhaust gases from the discharge end of the exhaust pipe 2. The air inducted through the second external air inlet ports 8 which verge on the relatively flattened throttling nozzle 10 is well mixed with the gases ejected from the throttling nozzle while they flow through the diffusion chamber 3 so that the temperature of the exhaust gases is rapidly and uniformly reduced before they have traversed the entire length of the diffusion chamber. In this case a large opening area of the second external air inlet ports 8 generally provides a larger amount of air induction therethrough. Furthermore, it is generally desirable for obtaining uniform temperature distribution of the gases discharged from the exhaust port 7 that the guide vanes 9 should be wide enough to cover a substantial part of the width of the tubular body 1 and that the axis of the diffusion chamber 3 should be long. As a result of various experiments, the inventors have found that the total opening area of the second external air inlet ports 8 should preferable be more than twice as large as the internal cross-sectional area of the exhaust pipe 2 and that the cross-sectional area of the exhaust port 7 should preferably be 2-2.5 times as large as the internal cross-sectional area of the exhaust pipe 2. Furthermore, as mentioned before, it is desirable that the tubular body 1 has a relatively flattened cross-sectional shape such as an oval or an ellipse.

Figure 4:
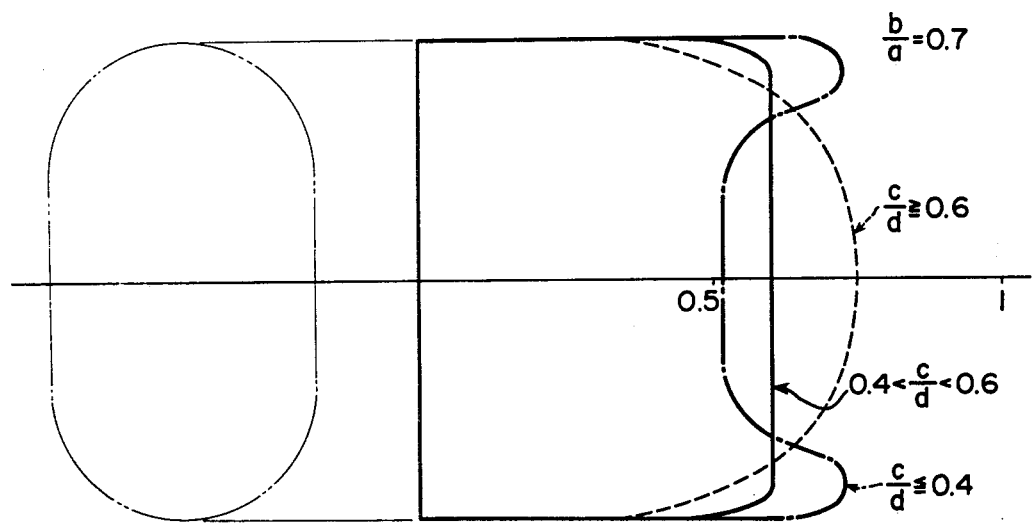
FIGS. 4 and 5 are diagrams showing area temperature distributions of the gases discharged from diffusers of the present invention of various dimensions.
Figure 5:
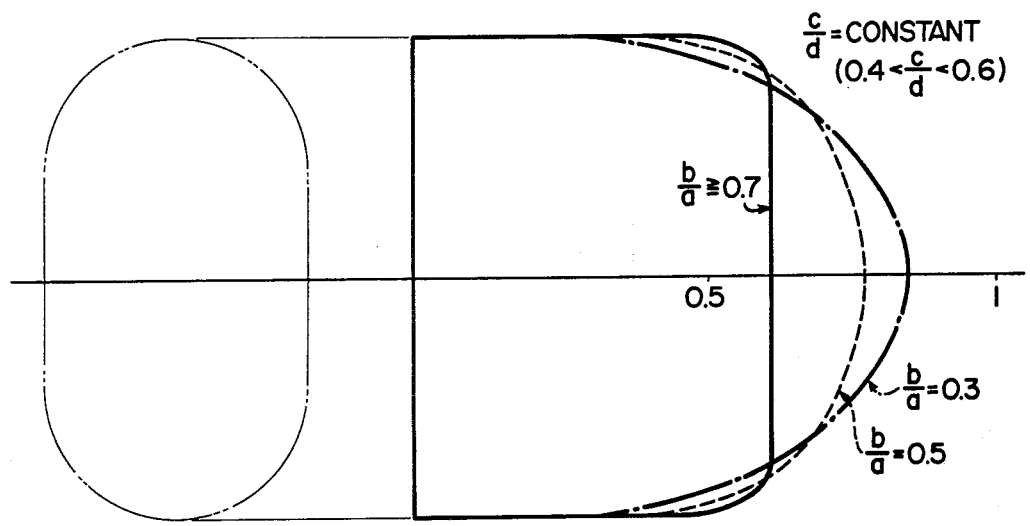

In FIGS. 4 and 5 the area distribution of the ratio of the temperature of the gases leaving the exhaust port 7 to the temperature of the exhaust gases leaving the exhaust pipe 2 is shown with respect to various possible dimensions for the diffuser. In FIG. 4 the ratio of the width b of the guide vanes 9 to the width a of the tubular body 1 is fixed at 0.7, whereas the ratio of the clearance c of the throttling nozzle 10 to the internal diameter d of the exhaust pipe 2 is changed to such values as 0.6 or larger, between 0.4 and 0.6, and 0.4 or smaller. In FIG. 5 the ratio c/d is maintained within the region between 0.4 and 0.6, whereas the ratio b/a is changed to various values such as 0.7 or larger, 0.5 and 0.3. From comparison of these two diagrams it will be understood that the desirable result is obtained when the ratio b/a is 0.7 or larger while the ratio c/d is between 0.4 and 0.6.

Figure 6:
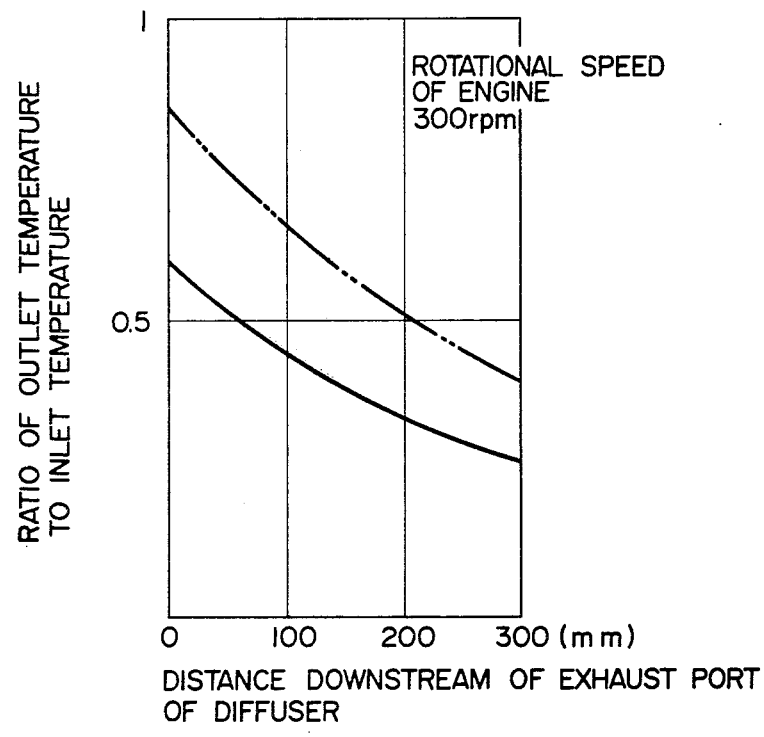
FIG. 6 is a graph demonstrating the effect of temperature reduction obtained by the diffuser of the present invention in comparison with a conventional diffuser.
Figure 7:
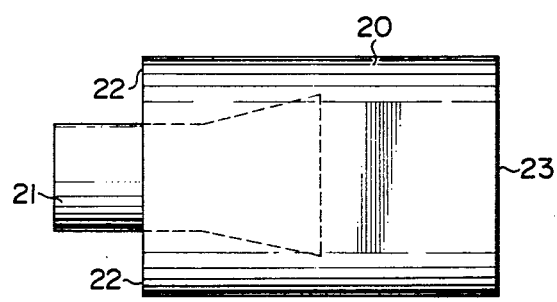
FIG. 7 is a plan view showing the conventional diffuser used for the comparison set out in FIG. 6.

FIG. 6 shows the performance of the exhaust gas diffuser of the present invention having dimensional conditions such as $b/a = 0.7$ and $0.4 < c/d < 0.6$ in comparison with a conventional exhaust gas diffuser such as shown in FIG. 7. In the graph of FIG. 6 the abscissa represents the distance from the exhaust port of the diffuser, while the ordinate represents the ratio of the temperature of gases leaving the exhaust port to the temperature of the exhaust gases leaving the exhaust pipe, wherein the solid line shows the performance of the diffuser of the present invention while the dots and dash line shows the performance of the diffuser shown in FIG. 7.

Referring to FIG. 7, the diffuser of this conventional type comprises a tubular body 20 having opposite open axial ends and an essentially oval cross-sectional shape in which is mounted a connection pipe 21 having a funnel-shaped exit end. Open end portions of the tubular body 20 left at opposite sides of the connection pipe 21 serve as external air inlet ports 22, while the other open end of the tubular body 20 serves as an exhaust port 23.

Returning to FIG. 6, it will be understood that the exhaust gas diffuser of the present invention has a very much improved performance when comared with the similar diffuser of the conventional type.

Although the invention has been shown and described with respect to a preferred embodiment thereof, it should be understood by those skilled in the art that various changes and omissions of the form and the detail thereof may be made therein without departing from the scope of the invention.

We claim:

1. An exhaust gas diffuser for connection to the discharge end of an exhaust pipe of an internal combustion engine, comprising:

a tubular body which has a relatively flattened cross-sectional shape and defines a passage therein, and a connecting pipe mounted to a first axial end of said tubular body at a central portion of the relatively flattened cross section of said tubular body so as to define a central exhaust gas inlet port by said connecting pipe and a pair of first external air inlet ports which open at opposite sides of said exhaust gas inlet port, said tubular body defining an exhaust port as its second axial end and having a pair of second external air inlet ports provided at its axially middle and relatively flattened wall portions and transversely elongated relative to the axis of the tubular body, and a pair of guide vanes which define the upstream edges of said pair of second external air inlet ports and which are inclined inwardly toward said exhaust port thereby defining a throttling nozzle at an axially middle portion of said passage, the ratio of the width of said guide vanes to the width of said relatively flattened tubular body being 0.7 or larger and the ratio of the clearance defined between the inner edges of said pair of guide vanes to the inside diameter of said connecting pipe being between 0.4 and 0.6.

2. The diffuser of claim 1, wherein said tubular body further includes two pairs of triangular wing vanes which integrally support opposite side ends of said guide vanes from said tubular body.

3. The diffuser of claim 1 or 2, wherein said pair of second external air inlet ports and said pair of guide vanes are located relatively closer to said first axial end of said tubular body than to said second axial end of said tubular body.

* * * * *